United States Patent
Kato et al.

(10) Patent No.: US 11,635,304 B2
(45) Date of Patent: Apr. 25, 2023

(54) MAP GENERATION DEVICE, CONTROL METHOD, PROGRAM AND STORAGE MEDIUM

(71) Applicant: PIONEER CORPORATION, Tokyo (JP)

(72) Inventors: Masahiro Kato, Kawagoe (JP); Kazuki Oyama, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 116 days.

(21) Appl. No.: 16/618,078
(22) PCT Filed: May 28, 2018
(86) PCT No.: PCT/JP2018/020362
§ 371 (c)(1),
(2) Date: Nov. 27, 2019
(87) PCT Pub. No.: WO2018/221454
PCT Pub. Date: Jun. 12, 2018

(65) Prior Publication Data
US 2020/0249050 A1 Aug. 6, 2020

(30) Foreign Application Priority Data
May 31, 2017 (JP) .............................. JP2017-108599

(51) Int. Cl.
*G01C 21/36* (2006.01)
*G01C 21/34* (2006.01)
(52) U.S. Cl.
CPC ..... *G01C 21/3691* (2013.01); *G01C 21/3407* (2013.01)
(58) Field of Classification Search
CPC ............ G01C 21/3691; G01C 21/3407; G01C 21/3833; G08G 1/0112; G08G 1/0129; G08G 1/04; G08G 1/0141; G09B 29/10
See application file for complete search history.

(56) References Cited

U.S. PATENT DOCUMENTS 9,341,488 B2 5/2016 Mund et al.
9,696,720 B2 * 7/2017 Seo .................. B60W 30/00
(Continued)

FOREIGN PATENT DOCUMENTS

JP 2005147713 A 6/2005
JP 2007183432 A 7/2007
(Continued)

OTHER PUBLICATIONS

International Search Report for related International Application No. PCT/JP2018/020362, dated Aug. 21, 2018 English translation provided; 4 pages.
(Continued)

*Primary Examiner* — Jess Whittington
*Assistant Examiner* — Brian E Yang
(74) *Attorney, Agent, or Firm* — Procopio, Cory, Hargreaves & Savitch LLP (57) ABSTRACT

A server device 200 is a map generation device which assigns, to voxel data in the map DB 20 which is divided into multiple voxels, a first weight value for each voxel, wherein the first weight value is associated with the presence of a stationary object and a moving object. Then, the server device 200 acquires upload information Iu which includes position information relating to a travelling route of a measurement vehicle during measurement of point cloud data needed for generation or update of the voxel data. Then, the server device 200 determines the first weight value for each voxel based on the travelling route of the measurement vehicle identified by the position information included in the upload information Iu.

9 Claims, 9 Drawing Sheets

(56) References Cited

U.S. PATENT DOCUMENTS

| | | | |
|---|---|---|---|
| 2007/0299606 A1 | 12/2007 | Fujimoto | |
| 2014/0118716 A1* | 5/2014 | Kaganovich | G01S 7/4808 |
| | | | 356/4.01 |
| 2014/0309841 A1 | 10/2014 | Hara et al. | |
| 2017/0025017 A1* | 1/2017 | Thomas | G08G 1/161 |
| 2017/0060133 A1* | 3/2017 | Seo | G08G 1/146 |
| 2017/0316333 A1* | 11/2017 | Levinson | B60W 60/00274 |
| 2018/0322777 A1* | 11/2018 | Titze | G08G 1/0141 |
| 2019/0147257 A1* | 5/2019 | Lindemann | G06V 20/582 |
| | | | 382/103 |
| 2020/0109954 A1* | 4/2020 | Li | G05D 1/0291 |
| 2020/0183011 A1* | 6/2020 | Lin | G01C 21/3881 |

FOREIGN PATENT DOCUMENTS

| | | | |
|---|---|---|---|
| JP | 2011248445 A | 12/2011 | |
| JP | 2012155660 A | 8/2012 | |
| JP | 2012208525 A | 10/2012 | |
| JP | 2016156973 A | 9/2016 | |
| WO | 2013076829 A1 | 5/2013 | |

OTHER PUBLICATIONS

Extended European Search Report dated Feb. 17, 2021, from counterpart EP Patent Application No. 18808927.0, 9 pages.

* cited by examiner

MAP GENERATION DEVICE, CONTROL METHOD, PROGRAM AND STORAGE MEDIUM

CROSS-REFERENCE TO RELATED APPLICATIONS

This application is a U.S. National Stage entry of PCT Application No: PCT/JP2018/020362 filed May 28, 2018, which claims priority to Japanese Patent Application No. 2017-108599, filed May 31, 2017, the contents of which are incorporated herein by reference.

TECHNICAL FIELD

The present invention relates to a technique of generating a map.

BACKGROUND TECHNIQUE

There is known a method of updating map data based on the output of sensors provided at vehicles. For example, Patent Reference 1 discloses a map data updating system in which each vehicle sends data associated with a point of variation in the map data detected by its sensor(s) to a map maintenance server, wherein the map data is updated in consideration of the reliability of the sensor(s) used at the time of detection of the point of the variation.

PRIOR ART REFERENCES

Patent References

Patent Reference 1: Japanese Patent Application Laid-open under No. 2016-156973

SUMMARY OF THE INVENTION

Problem to be Solved by the Invention

When a road and its vicinity are measured by a measurement vehicle for generating a map, there are cases that a stationary construction subjected to measurement cannot be correctly measured due to the occlusion thereof caused by one or more moving bodies such as a pedestrian and a vehicle. Such cases in which the occlusion occurs are not considered in Patent Reference 1.

The above is an example of issues to be solved by the present invention. It is an object of the present invention to provide a map generation device capable of generating a map in consideration of a possibility of occurrence of the occlusion.

Means for Solving the Problem

An invention described in claims is an output device including: a map generation device which assigns, to map data which is divided into multiple regions, a weight value associated with presence of a stationary object and a moving object, the map generation device including: an acquisition unit configured to acquire a travelling route during measurement of data that is needed for generation or update of the map data; and a determination unit configured to determine, on a basis of the travelling route, the weight value for each of the multiple regions.

Another invention described in claims is a map data structure indicative of a map, including, with respect to each of regions into which space is regularly divided, at least one of: a weight value associated with presence of a stationary object and a moving object; or accuracy information indicative of an accuracy of data in each of the regions.

Still another invention described in claims is a control method executed by a map generation device, the map generation device assigning, to map data which is divided into multiple regions, a weight value associated with presence of a stationary object and a moving object, the control method including: an acquisition process to acquire a travelling route during measurement of data that is needed for generation or update of the map data; and a determination process to determine, on a basis of the travelling route, the weight value for each of the multiple regions.

Still another invention described in claims is a program executed by a computer of a map generation device, the map generation device assigning, to map data which is divided into multiple regions, a weight value associated with presence of a stationary object and a moving object, the program causing the computer to function as: an acquisition unit configured to acquire a travelling route during measurement of data that is needed for generation or update of the map data; and a determination unit configured to determine, on a basis of the travelling route, the weight value for each of the multiple regions.

DETAILED DESCRIPTION OF THE PREFERRED EMBODIMENTS

According to a preferable embodiment of the present invention, there is provided an output device including: a map generation device which assigns, to map data which is divided into multiple regions, a weight value associated with presence of a stationary object and a moving object, the map generation device including: an acquisition unit configured to acquire a travelling route during measurement of data that is needed for generation or update of the map data; and a determination unit configured to determine, on a basis of the travelling route, the weight value for each of the multiple regions. According to this mode, the map generation device suitably determines a weight value for each voxel associated with the presence of a stationary object and a moving object, thereby assigning the weight value to map data.

In one mode of the map generation device, the determination unit determines, on a basis of a position of a lane on the travelling route, the weight value for each of the multiple regions. In some embodiment, in a case where the lane on the travelling route is a lane on a left side, the determination unit increases the weight value corresponding to a region located to a left side of the lane, wherein in a case where the lane on the travelling route is a lane on a right side, the determination unit increases the weight value corresponding to a region located to a right side of the lane. According to this mode, the map generation device increases the weight value for a region with decreasing probability of the occlusion thereof due to other vehicle(s) which are travelling on other lane (s) in the same road while decreasing the weight value for a region with increasing probability of the occlusion thereof due to other vehicle(s) which are travelling on other lane (s) in the same road.

In another mode of the map generation device, in a section where an obstacle is avoided on the travelling route, the determination unit decreases the weight value corresponding to a region located on an opposite side to an avoidance direction. In such a section that an obstacle is avoided on the travelling route, the occlusion due to the obstacle is likely to occur in the direction opposite to the avoidance direction. Thus, in this mode, it is possible to determine the weight value while properly considering the presence of such an obstacle.

In still another mode of the map generation device, the determination unit determines the weight value corresponding to each of the multiple regions based on a height of each of the multiple regions. There is a tendency that the probability of the occlusion of a region due to a moving body decreases with the increasing height (altitude) of the region if the longitude and the latitude are constant. Thus, according to this mode, the map generation device can suitably determine the weight value for each voxel.

In still another mode of the map generation device, for a target region of measurement, the determination unit assigns, to the map data, accuracy information indicative of an accuracy of measurement data in the target region. According to this mode, it is possible to suitably assign (add), to map data, information associated with reliability of the map data. In some embodiments, the determination unit determines the accuracy information based on an accuracy of an estimated position at a time of the measurement and a distance between a measurement position and the target region of the measurement.

According to another preferable embodiment of the present invention, there is provided a map data structure indicative of a map, including, with respect to each of regions into which space is regularly divided, at least one of: a weight value associated with presence of a stationary object and a moving object; or accuracy information indicative of an accuracy of data in each of the regions. In a map having the above map data structure, at least one of a weight value or accuracy information is included. Accordingly, a device with reference to the map can suitably use, at the time of updating the map or using the map, the weight value or the accuracy information as information associated with the reliability of data of the map.

According to another preferable embodiment of the present invention, there is provided a control method executed by a map generation device, the map generation device assigning, to map data which is divided into multiple regions, a weight value associated with presence of a stationary object and a moving object, the control method including: an acquisition process to acquire a travelling route during measurement of data that is needed for generation or update of the map data; and a determination process to determine, on a basis of the travelling route, the weight value for each of the multiple regions. By executing the control method, the map generation device suitably determines a weight value for each voxel associated with the presence of a stationary object and a moving object, thereby assigning the weight value to map data.

According to still another preferable embodiment of the present invention, there is provided a program executed by a computer of a map generation device, the map generation device assigning, to map data which is divided into multiple regions, a weight value associated with presence of a stationary object and a moving object, the program causing the computer to function as: an acquisition unit configured to acquire a travelling route during measurement of data that is needed for generation or update of the map data; and a determination unit configured to determine, on a basis of the travelling route, the weight value for each of the multiple regions. By executing the above program, the computer suitably determines a weight value for each voxel associated with the presence of a stationary object and a moving object, thereby assigning the weight value to map data. In some embodiments, a storage medium stores the above program.

Embodiments

A preferred embodiment of the present invention will be described below with reference to the attached drawings.

[System Overview]

Figure 1:
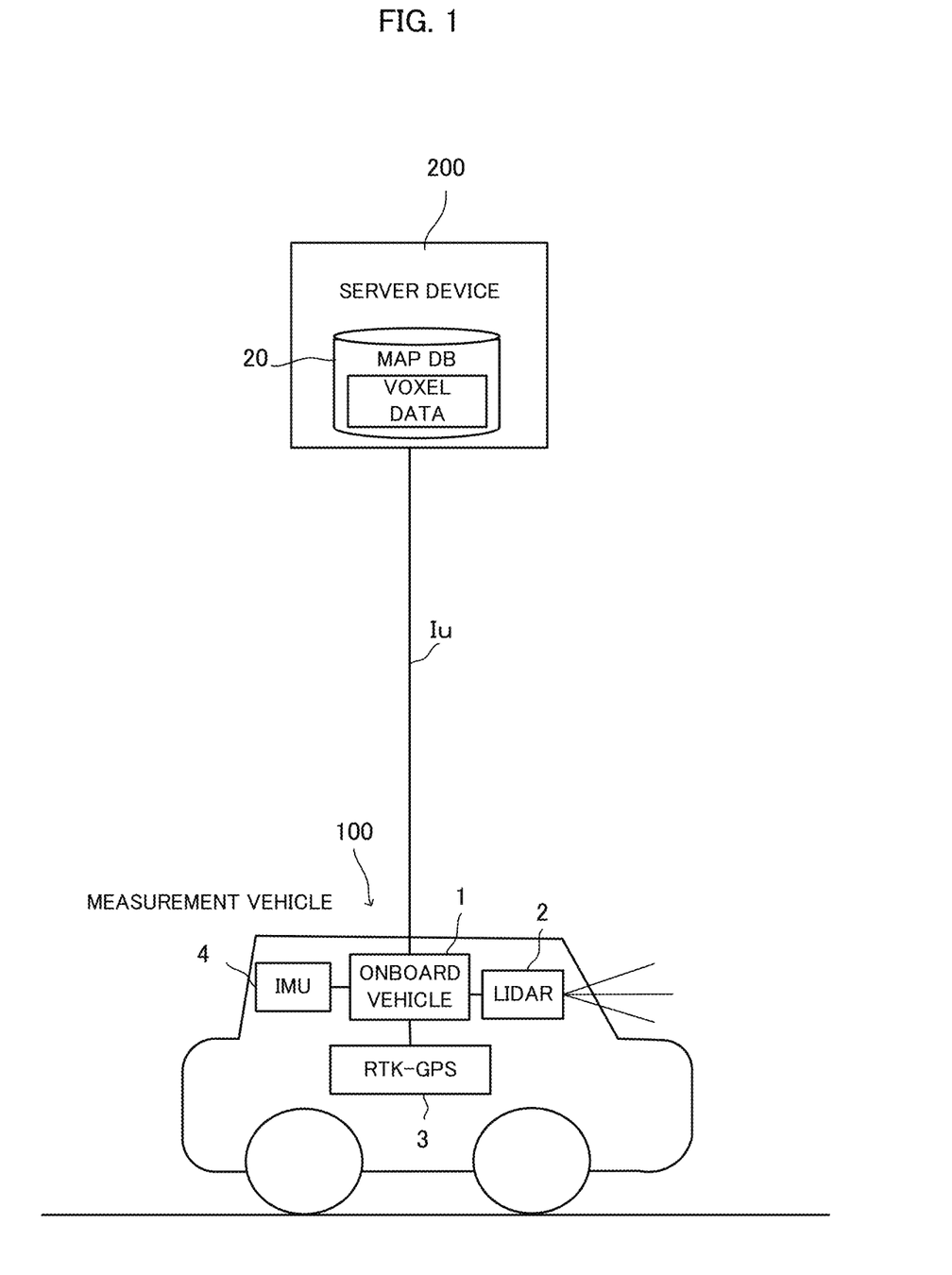
FIG. 1 is a diagram illustrating a schematic configuration of a map generation system.

FIG. 1 is a schematic configuration diagram of a map generation system according to the embodiments. The map generation system is a system for generating position information that is necessary for autonomous driving, of features in surroundings of roads. The map generation system roughly includes a measurement unit 100 mounted on a measurement vehicle and a server device 200.

The measurement unit 100 is a system which generates a three-dimensional point cloud data with a high degree of accuracy and roughly includes a onboard vehicle 1, a lidar (Light Detection and Ranging or Laser Illuminated Detection and Ranging) 2, a RTK-GPS (Real Time Kinematic Global Positioning System) receiver 3 and an IMU (Inertial Measurement Unit) 4.

The lidar 2 emits pulse lasers within a predetermined angle range in a horizontal direction and a vertical direction to discretely measure the distance to an object existing in an external field and generates three-dimensional point cloud information indicating the position of the object. In this case, the lidar 2 includes an radiation unit which radiates the laser light while changing the radiation direction, a light receiving unit which receives the reflected light (scattering light) of the radiated laser light, and an output unit which outputs scan data based on the light receiving signal outputted by the light receiving unit. The scan data is generated based on the radiation direction corresponding to the laser light received by the light receiving unit and the response delay time of the laser light specified based on the light receiving signal. Generally, the shorter the distance to the target object is, the higher the accuracy of the distance measurement value outputted by the lidar becomes, whereas the longer the distance to the target object is, the lower the above accuracy becomes.

The RTK-GPS receiver 3 generates position information with a high degree of accuracy indicative of the absolute position (e.g., three-dimensional position specified by longitude, latitude and altitude) of the measurement vehicle based on the RTK positioning method (i.e., interferometric positioning method). The RTK-GPS receiver 3 outputs, to the onboard vehicle 1, the generated position information and information (referred to as "position accuracy information") associated with the accuracy (correctness) of the position information. The IMU (inertial measurement unit) 4 outputs the acceleration and the angular speed (or angle) of the measurement vehicle with respect to three axis directions.

The onboard vehicle 1 specifies the absolute position and orientation (azimuth direction) based on the output supplied from the RTK-GPS receiver 3 and calculates absolute three-dimensional position information with respect to each point of the point cloud detected by the lidar 2 from relative three-dimensional position information that depends on the position and the orientation of the measurement vehicle. It is noted that the onboard vehicle 1 may specify the absolute position and orientation of the measurement vehicle based on not only the output supplied from the RTK-GPS receiver 3 but also the output supplied from the IMU 4. Then, the onboard vehicle 1 supplies the server device 200 with the calculated three-dimensional point cloud data, as upload information "Iu", together with the position information and the position accuracy information regarding the measurement vehicle outputted by the RTK-GPS receiver 3 during the measurement. In this case, the onboard vehicle 1 may immediately send the upload information Iu by wireless communication or may store the upload information Iu on a storage (memory) medium which the server device 200 can read later.

The server device 200 memorizes the upload information Iu supplied from the onboard vehicle 1 and updates the map DB (DB: DataBase) 20 based on the memorized upload information Iu. The map DB 20 includes voxel data in which there is recorded position information of stationary object(s) with respect to each of regions (referred to as "voxels") into which three-dimensional space is regularly divided. The voxel data includes data that expresses, in a form of normal distribution, the point cloud data of the measured stationary structure(s) in each voxel. The voxel data is used for a scan matching by use of NDT (Normal Distributions Transform). As mentioned later, on the basis of the upload information Iu, the server device 200 updates (including "generates") the voxel data corresponding to voxels located within the measurable range by the measurement vehicle. The server device 200 is an example of the "map generation device" according to the present invention and the voxel data is an example of the "map data" according to the present invention.

Figure 2A:
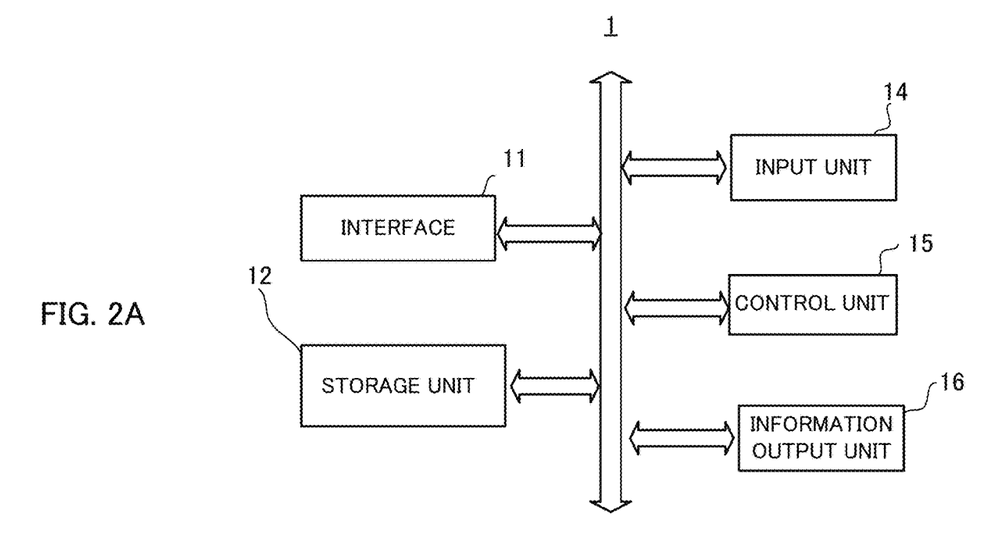
FIGS. 2A and 2B are block diagrams illustrating functional configurations of an onboard device and a server device.

FIG. 2A is a block diagram illustrating a functional configuration of the onboard device 1. The onboard device 1 mainly includes an interface 11, a storage (memory) unit 12, an input unit 14, a control unit 15 and an information output unit 16. These elements are connected with each other by a bus line.

The interface 11 acquires the output data from the sensors such as the lidar 2, the RTK-GPS receiver 3 and the IMU 4 and the GPS and supplies them to the control unit 15. The storage unit 12 stores programs executed by the control unit 15 and information necessary for the control unit 15 to execute predetermined processing. The input unit 14 may be buttons, a touch panel, a remote controller or a voice input device to be operated by a user. The information output unit 16 may be a display or a speaker for outputting information based on the control by the control unit 15. The control unit 15 includes a CPU for executing programs and controls the entire onboard device 1.

Figure 2B:
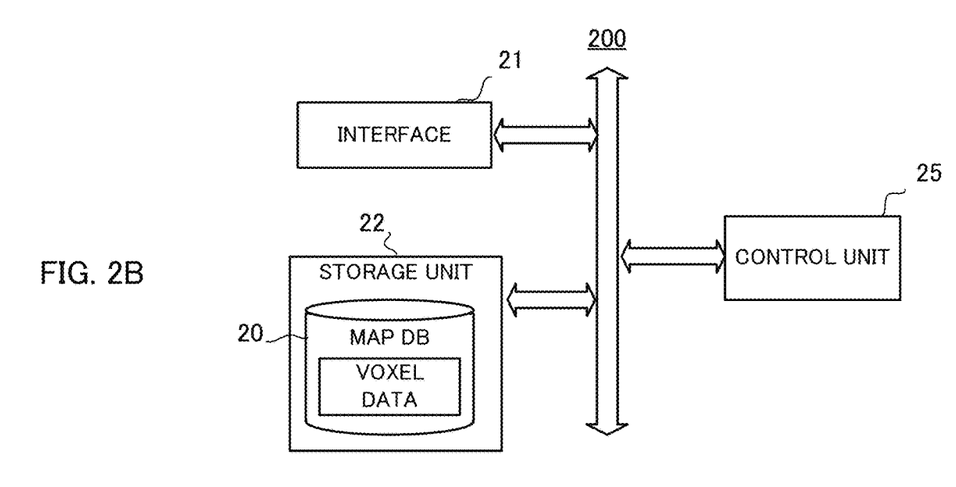

FIG. 2B is a block diagram illustrating a functional configuration of the server device 200. The server device 200 mainly includes an interface 21, a storage unit 22 and a control unit 25.

The interface 21 acquires the upload information Iu generated by the onboard vehicle 1 under the control of the control unit 25. The interface 21 may be a wireless interface for wirelessly communicating with the onboard vehicle 1 or may be a hardware interface for reading out the upload information Iu from a storage medium on which the upload information Iu is stored.

The storage unit 22 stores programs executed by the control unit 25 and information necessary for the control unit 25 to execute predetermined processing. According to the embodiment, under the control of the control unit 25, the storage unit 22 stores the upload information Iu which the interface 21 acquires. Besides, the storage unit 22 stores the map DB 20 which includes the voxel data that is updated by use of the upload information Iu. It is noted that the map DB 20 includes not only the voxel data but also road data that is necessary for identifying the travelling lane of the measurement vehicle based on the position information.

The control unit 25 executes the program stored on the storage unit 22 and controls the entire server device 200. According to the embodiment, the control unit 25 acquires the upload information Iu through the interface 21 and stores the upload information Iu on the storage unit 22. Thereafter, the control unit 25 updates the voxel data in the map DB 20 based on the upload information Iu that is stored on the storage unit 22. The control unit 25 is an example of the "acquisition unit", the "determination unit" and the "computer" which executes a program according to the present invention.

[Data Structure of Voxel Data]

Figure 3:
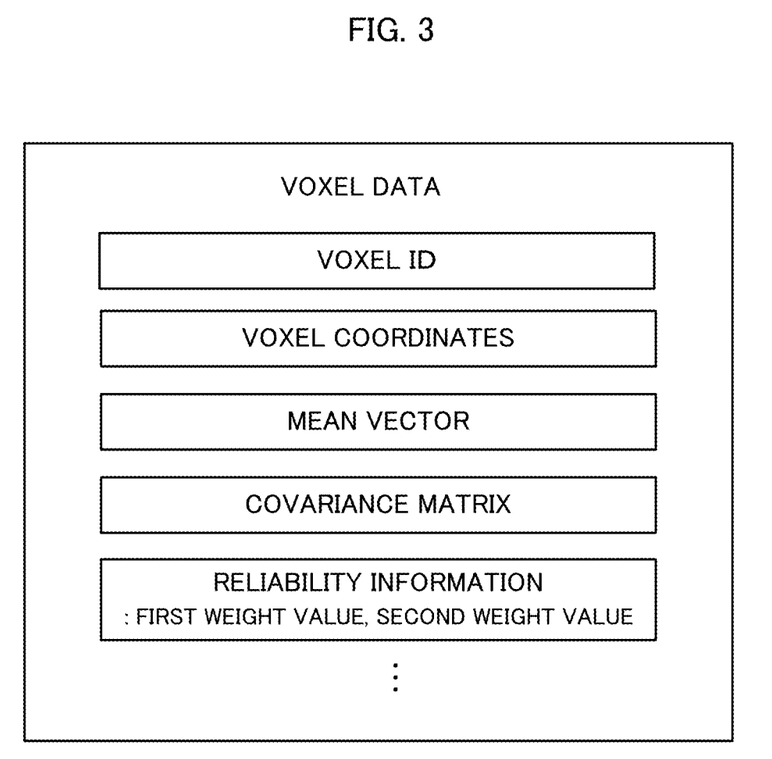
FIG. 3 schematically illustrates an example of the data structure of voxel data.

A description will be given of the voxel data to be used for the scan matching based on NDT. FIG. 3 schematically illustrates an example of the data structure of the voxel data.

The voxel data includes information relating to parameters of a normal distribution for expressing the point cloud in each voxel. According to the embodiment, as illustrated in FIG. 3, the voxel data includes the voxel ID, the voxel coordinates, the mean vector, the covariance matrix and the reliability information. The "voxel coordinates" herein indicates three-dimensional absolute coordinates of the reference position (such as central position) of each voxel. It is noted that each voxel is a cube or grid into which space is divided in a reticular pattern and the shape and the size thereof is preliminarily determined. Thus, it is possible to identify a region of a voxel by its voxel coordinates. It is also noted that the voxel coordinates may be used as a voxel ID.

The "mean vector" and "covariance matrix" indicate the mean vector and the covariance matrix corresponding to parameters of the normal distribution which stands for the point cloud in a target voxel, respectively. Here, the coordinates of a point "i" in a voxel "k" is defined as follows.

$$X_k(i) = \begin{bmatrix} x_k(i) \\ y_k(i) \\ z_k(i) \end{bmatrix}$$

Furthermore, the number of points included in the point cloud in the voxel k is also defined as "$N_k$". Then, the mean vector "$\mu_k$" and the covariance matrix "$V_k$" are expressed as the following equation (1) and the equation (2), respectively.

$$\mu_k = \begin{bmatrix} \bar{x}_k \\ \bar{y}_k \\ \bar{z}_k \end{bmatrix} = \frac{1}{N_k} \sum_{i=1}^{N_k} X_k(i) \quad (1)$$

$$V_k = \frac{1}{N_k - 1} \sum_{i=1}^{N_k} \{X_k(i) - \mu_k\}\{X_k(i) - \mu_k\}^T \quad (2)$$

The "reliability information" includes a first weight value and a second weight value, wherein the first weight value is a weight value based on the possibility of the occlusion (shielding by obstacle(s)) of the target voxel and the second weight value is a weight value based on the accuracy (correctness) of the voxel data (especially, the mean vector and covariance matrix) of the target voxel. As mentioned later, the second weight value is determined based on: the accuracy of the estimated position of a measurement vehicle at the time of measurement; and the accuracy of the measurement by the lidar 2. In the embodiment, it is assumed that the smaller the probability of the occlusion of a voxel is, the larger the first weight value corresponding to the voxel becomes. It is also assumed that the higher the accuracy of the data corresponding to a voxel is, the larger the second weight value corresponding to the voxel becomes. A description will be given later of specific determination approaches of the first weight value and the second weight value. The first weight value is an example of the "weight value" according to the present invention. The second weight value is an example of the "accuracy information" according to the present invention. The data structure of the voxel data illustrated in FIG. 3 is an example of the "map data structure" according to the present invention.

[Update of Voxel Data]

Next, a description will be given of the updating process of the voxel data in the map DB 20 based on the upload information Iu.

The server device 200 divides (classifies) the point cloud data, which is included in the upload information Iu supplied from the onboard vehicle 1, per voxel where each point of the point cloud data belongs and generates NDT data (i.e., the mean vector and the covariance matrix) per voxel. Furthermore, along with the NDT data, the server device 200 determines the first weight value and the second weight value to be registered in the map DB 20 with respect to each voxel. Hereinafter, a description will be given of approaches for determining the first weight value and the second weight value, respectively.

(1) Approaches for Determining First Weight Value

The server device 200 identifies the traveling route of a measurement vehicle based on the position information of the measurement vehicle included in the upload information Iu and determines the first weight value in accordance with the identified travelling route. Hereinafter, the extreme left-hand lane is referred to as "leftmost lane" and the extreme right-hand lane is referred to as "rightmost lane".

Figure 4:
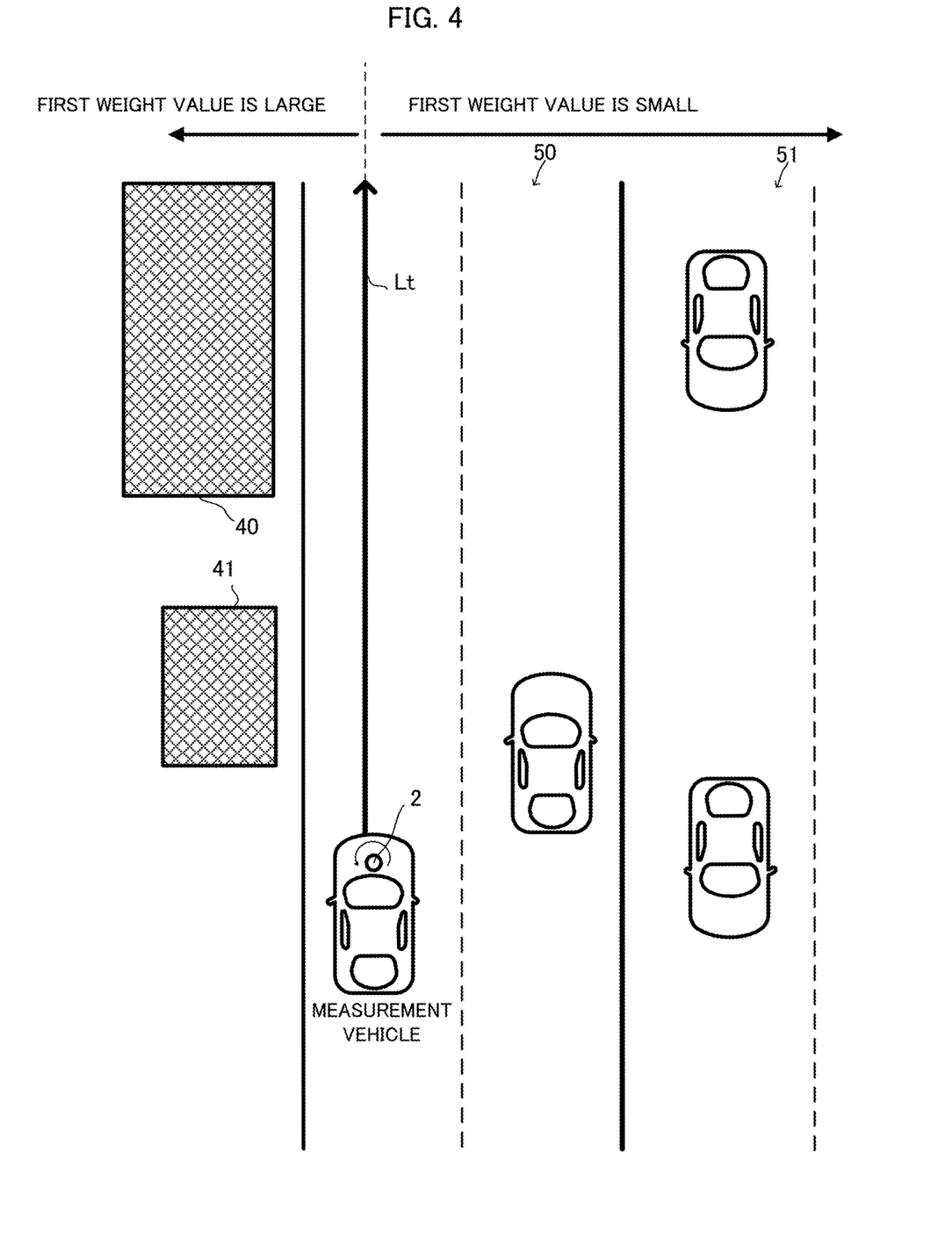
FIG. 4 is a plane view schematically illustrating the peripheral situation of the measurement vehicle which is travelling on a road with two lanes each way.

FIG. 4 is a plane view schematically illustrating the peripheral situation of the measurement vehicle which is travelling on a road 50 with two lanes each way. According to the example illustrated in FIG. 4, the measurement vehicle is travelling on the leftmost lane of the road 50 along the arrow "Lt". There are features 40 and 41 located to the left (berm side) of the road 50 and there is a road 51 of opposite lanes located to the right side of the road 51.

As illustrated in FIG. 4, in principle, the measurement vehicle travels on the leftmost lane at the time of travelling on a road with multiple lanes each way. Thereby, the measurement vehicle measures, by the lidar 2, feature (s) (features 40 and 41 in case of FIG. 4) located along the travelling road (road 50 in case of FIG. 4) without occurrence of any occlusion by other vehicle(s) travelling on the road 50.

During the period that the measurement vehicle travels along the arrow L1, the onboard vehicle 1 generates the upload information Iu which includes the position information indicative of the position on the leftmost lane of the road 50 and the point cloud data of the features 40 and 41 measured by the lidar 2. When the server device 200 acquires the upload information Iu generated by the upload information Iu, the server device 200 identifies, on the basis of the position information included in the upload information Iu and the road data included in the map DB 20, the travelling route of the measurement vehicle indicated by the arrow Lt. Then, the server device 200 determines that the paint cloud data, which is included in the upload information Iu together with the position information that is used for the identification of the travelling route, is measured in travelling on the leftmost lane.

Thus, in this case, the server device 200 identifies voxels located to the left side of the travelling track (i.e., leftmost lane) that is specified by the position information of the upload information Iu. Then, the server device 200 determines that there is a high probability that the identified voxels include the point cloud data of stationary structure(s) without any occlusion. Thus, in this case, the server device 200 sets a relatively large value (e.g., a value larger than its initial value) to the first weight value corresponding to such voxels (e.g., voxels overlapping with the features 40 and 41) that are located to the left. In contrast, for such voxels that is located to the right side of the travelling track specified by the position information of the upload information Iu, the server device 200 determines that the occlusion is likely to occur due to the existence of other vehicle(s) which is travelling on the road 50. Thus, in this case, the server device 200 sets a relatively small value (e.g., a value smaller than its initial value) to the first weight value corresponding to such voxels that are located to the right.

It is noted that, if the server device 200 detects any action to avoid an obstacle such as a parked vehicle at the berm that is located at the left side, the server device 200 may lower the first weight value corresponding to such voxels that are located to the left side of the lidar 2 at the time of detecting the action, even in cases where the server device 200 determines that the measurement vehicle is travelling on the leftmost lane.

Figure 5:
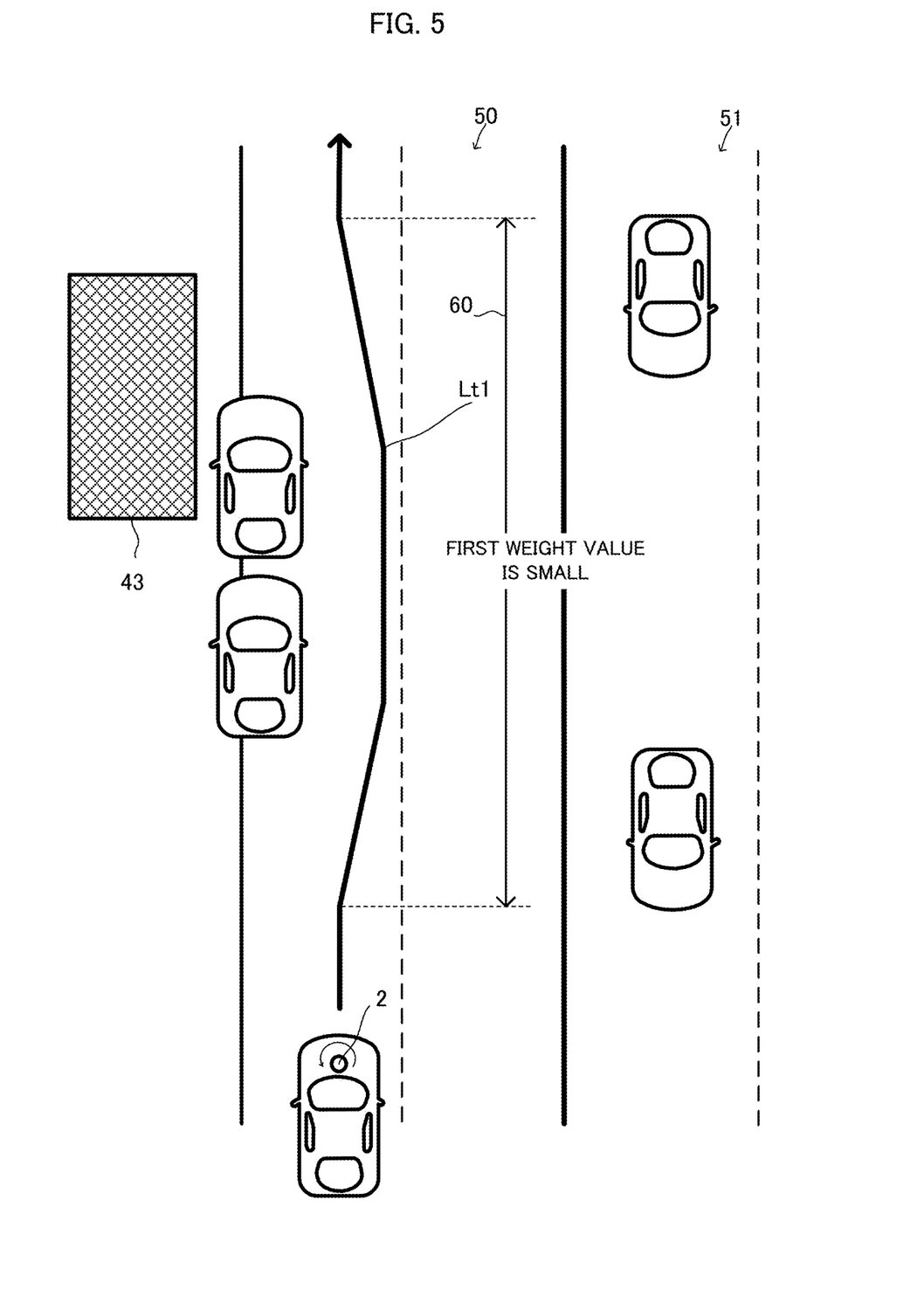
FIG. 5 is a plane view schematically illustrating peripheral situation of the measurement vehicle which is travelling on a section of a road where parked vehicles exist.

FIG. 5 is a plane view schematically illustrating peripheral situation of the measurement vehicle which is travelling on a section of the road 50 where parked vehicles exist. In case of the example illustrated in FIG. 5, the measurement vehicle is travelling on the road 50 along the arrow "Lt1". As indicated by the arrow Lt1, the measurement vehicle detects parked vehicles at the time of travelling on the leftmost lane of the road 50 and therefore travels while being temporally deflected to the rightmost lane in order to avoid the parked vehicles.

In this case, while the measurement vehicle is travelling along the arrow Lt1, the onboard vehicle 1 generates the upload information Iu which includes point cloud data of the feature 43 and the like generated by lidar 2 and the position information indicative of the positions on the road 50. When the server device 200 acquires the upload information Iu generated by the onboard vehicle 1, the server device 200 identifies the travelling route of the measurement vehicle indicated by the arrow Lt1 based on the position information included in the upload information Iu and the road data included in the map DB 20.

Then, in this case, the server device 200 recognizes, as an action to avoid an obstacle, the action of the measurement vehicle to move with the travelling position being temporally deflected to the rightmost lane during travelling on the leftmost lane. Then, for the traveling section (see the arrow 60) where the server device 200 recognizes that the action to avoid an obstacle is performed, the server device 200 sets a relatively small value (e.g., a value smaller than its initial value) to the first weight value corresponding to such voxels that are located to the left side of the travelling track indicated by the position information of the upload information Iu regardless of the travelling route being on the leftmost lane. In cases of the example illustrated in FIG. 5, even though the feature 43 is within the measurable range by the lidar 2 during travelling on the section indicated by the arrow 60, it is estimated that the reliability of the point cloud data indicative of the feature 43 acquired in the section that is indicated by the arrow 60 is relatively small due to the high probability of occurrence of the occlusion by the parked vehicles. Accordingly, in the case of the example illustrated in FIG. 5, for the section indicated by the arrow 60, the server device 200 lowers the first weight value corresponding to such voxels (including voxels overlapping with the feature 43) that are located to the left side of the measurement vehicle. In this way, according to the example illustrated in FIG. 5, it is possible to suitably determine the first weight value of voxels to be measured in such a section that an occlusion could occur.

At the time of traveling on a road with multiple lanes each way, the measurement vehicle may travel not only on the leftmost lane but also on the rightmost lane if there is a feature suitable for measurement by the lidar 2 such as a center divider (center median) on the side of the rightmost lane. In this case, the server device 200 sets the first weight value so that the first weight value corresponding to voxels located to the right side of the measurement vehicle is larger than the first weight value corresponding to voxels located to the left side of the measurement vehicle.

Figure 6:
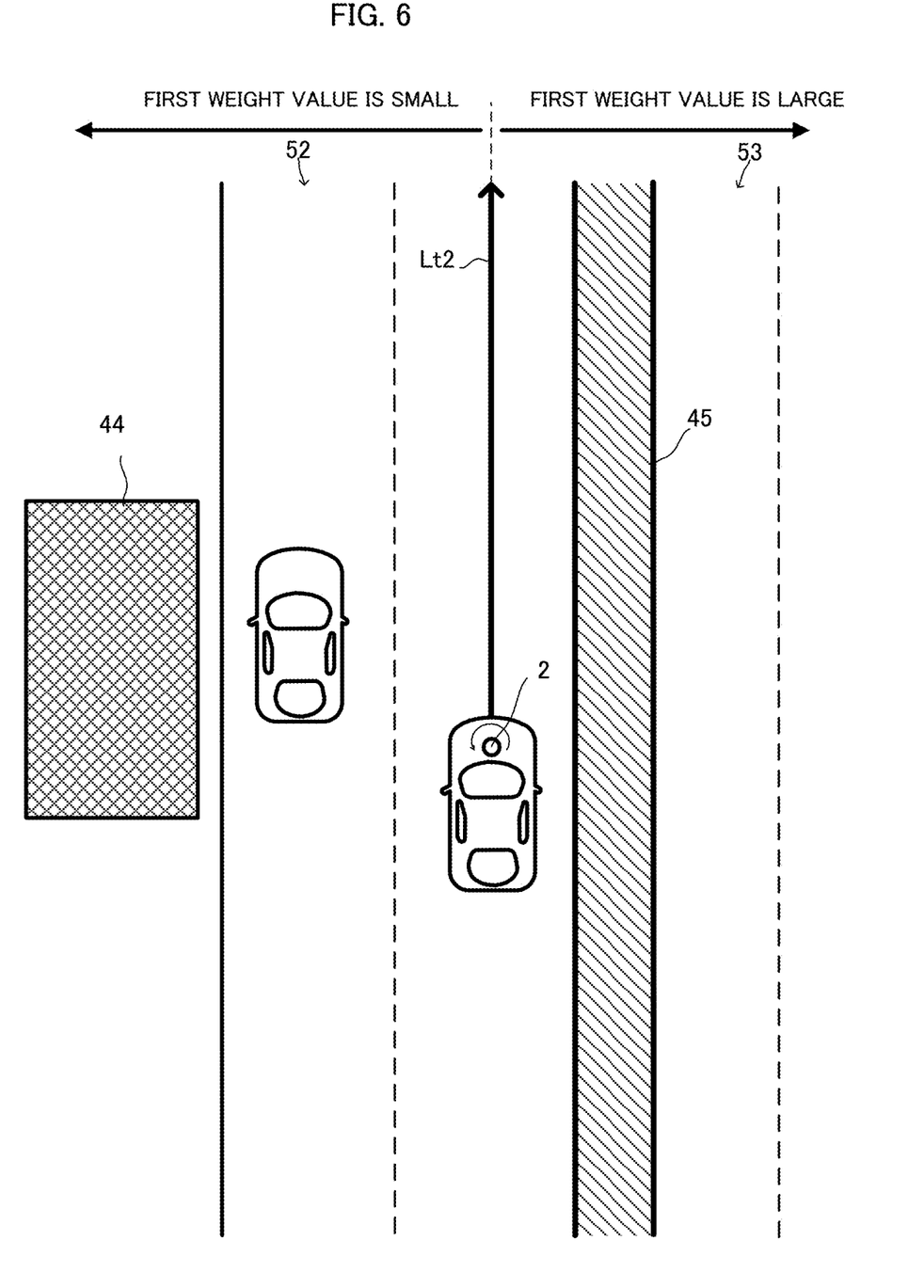
FIG. 6 is a plane view schematically illustrating the peripheral situation of the measurement vehicle in cases that there is a three-dimensional center divider suitable for measurement by lidar.

FIG. 6 is a plane view schematically illustrating the peripheral situation of the measurement vehicle in cases that there is a three-dimensional center divider 45 suitable for measurement by the lidar 2 between a road 52 and a road 53. In the case of the example illustrated in FIG. 6, the measurement vehicle is travelling on the rightmost lane along the arrow "Lt2" in order to measure the center diver 45 by the lidar 2. Furthermore, there is a feature 44 to the left side (side of the berm) of the road 52.

In this case, during the period that the measurement vehicle travels along the arrow Lt2, onboard vehicle 1 generates the upload information Iu which includes the position information indicative of positions on the rightmost lane of the road 52 and the point cloud data measured by the lidar 2. When the server device 200 acquires the upload information Iu generated by the onboard vehicle 1, the server device 200 identifies the travelling route of the measurement vehicle indicated by the arrow Lt2 based on the position information included in the upload information Iu and the road data included in the map DB 20. On the basis of the identified travelling route, the server device 200 determines that the point cloud data included in the upload information Iu is measured during the time period that the measurement vehicle is travelling on the rightmost lane of the road 52.

Thus, in this case, the server device 200 identifies voxels located to the right side of the travelling track indicated by the position information of the upload information Iu and determines that the identified voxels are likely to have the point cloud data of stationary object(s) without occurrence of any occlusion. Thus, in this case, the server device 200 sets a relatively large value to the first weight value corresponding to such voxels, which includes voxels overlapping with the center divider, that are located to the right side of the measurement vehicle. In contrast, for such voxels that are located to the left side of the travelling track indicated by the position information of the upload information Iu, the server device 200 determines that an occlusion by vehicle(s) travelling on the lane to the left side is likely to occur. Thus, in this case, the server device 200 sets a relatively small value to the first weight value corresponding to such voxels, which includes voxels overlapping with the feature 44, that are located to the left side of the measurement vehicle.

According to FIGS. 4 to 6, cases of roads to which the left-hand traffic is applied is illustrated as examples. Instead, it is possible to set the first weight value even in cases of roads to which the right-hand traffic is applied as well. Even in these cases, for voxels subjected to measurement at the time of travelling on the rightmost lane, the server device 200 determines the first weight value so that the first weight value corresponding to a voxel located to the right is larger than the first weight value corresponding to a voxel located to the left. In contrast, for voxels subjected to measurement at the time of travelling on the leftmost lane, the server device 200 determines the first weight value so that the first weight value corresponding to a voxel located to the left is larger than the first weight value corresponding to a voxel located to the right.

Besides, the server device 200 may determine the first weight value for each voxel based, on not only the travelling route of the measurement vehicle but also the height (i.e., altitude) of the position of each voxel.

Figure 7:
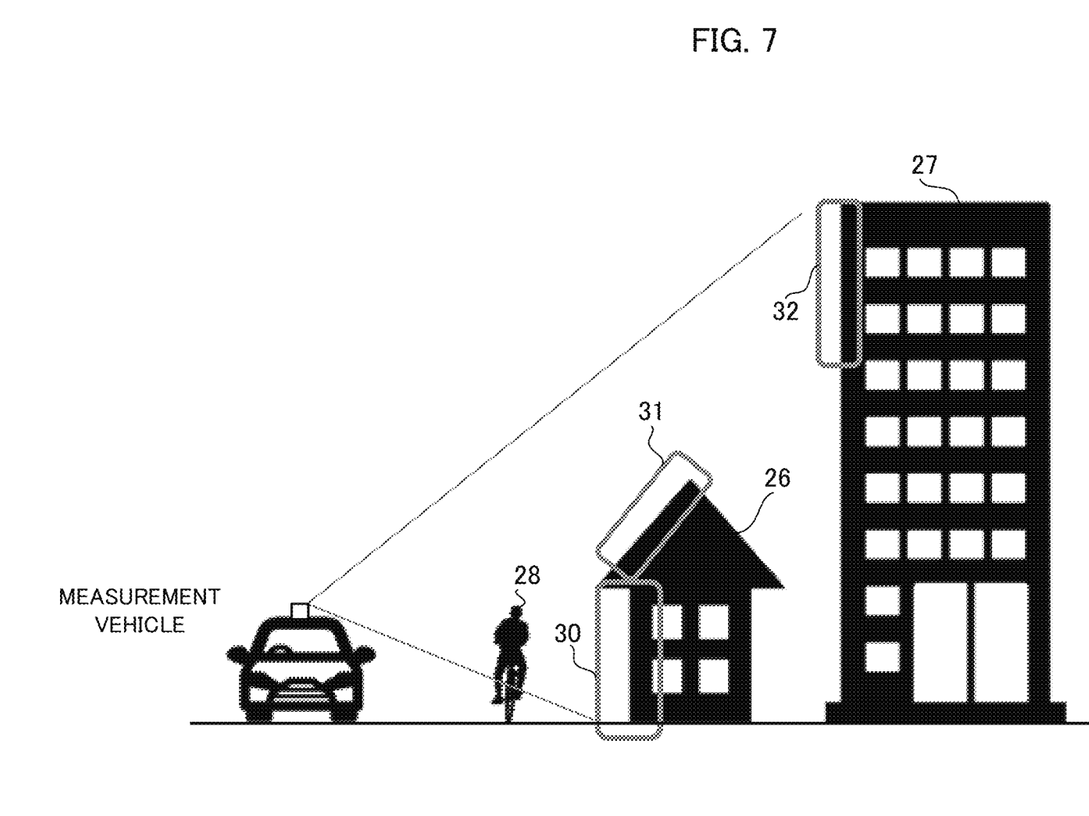
FIG. 7 illustrates an example of a positional relation between a measurement vehicle equipped with a lidar and objects located within the left-side range of measurement by the measurement vehicle.

FIG. 7 illustrates an example of a positional relation between a measurement vehicle equipped with a lidar and objects located within the left-side range of measurement by the measurement vehicle. According to the example illustrated in FIG. 7, there is a low-rise construction 26 that is a feature (stationary object) in the vicinity of the road where the vehicle travels and there is also a high-rise construction 27 behind the low-rise construction 26. Additionally, there is a person 28 who is riding on a bicycle in front of the low-rise construction 26. In this case, the measurement vehicle acquires, through the lidar 2, the measurement data indicative of the positions in the frames 30 to 32.

In this case, a portion of the low-rise construction 26 surrounded by the frame 30 is located at a relatively low position at which an occlusion by a moving body such as the person 28 is likely to occur. A portion of the low-rise construction 26 surrounded by the frame 31 is located at such a position a little higher than the measurement vehicle. However, at the portion, there remains a possibility of occurrence of an occlusion by a tall vehicle such as a truck. In contrast, a portion of the high-rise construction 27 surrounded by the frame 32 is located at a relatively high position at which an occlusion by a moving body such as the person 28 and other vehicles is not likely to occur.

Thus, in this case, in some embodiments, the server device 200 sets a small value to the first weight value of the voxel data corresponding to the position overlapping with the frame 30 and sets a intermediate value to the first weight value of the voxel data corresponding to the position overlapping with the frame 31 and sets a large value to the first weight value of the voxel data corresponding to the position overlapping with the frame 32. In this way, for voxels located on the same side of the measurement vehicle, the server device 200 may determine the first weight value for each of voxels in accordance with the height of position of each of the voxels. Thereby, the server device 200 can determine the first weight value for each voxel while suitably reflecting the possibility of the occurrence of the occlusion therein.

(2) Approaches for Determining Second Weight Value

The second weight value is determined based on the accuracy of the estimated position of a measurement vehicle during measurement by the measurement vehicle and the accuracy of measurement by the lidar 2. The upload information Iu includes the point cloud data to be used for generating the voxel data together with the position information based on the RTK-GPS receiver 3 and the position accuracy information thereof. On the basis of the position accuracy information included in the upload information Iu, the server device 200 calculates the accuracy of the estimated position of the measurement vehicle to be used for calculating the second weight value for each voxel.

Generally, the shorter the distance to a target object is, the higher the accuracy of the distance measurement value outputted by the lidar 2 becomes, whereas the longer the distance to the target object is, the lower the above accuracy becomes. Thus, for example, the server device 200 determines the accuracy of measurement by the lidar 2 based on the distance between the position indicated by the position information of the measurement vehicle included in the upload information Iu and the position indicated by the voxel coordinates of each voxel.

Then, for example, the server device 200 calculates the accuracy for each voxel through the calculation of the square-root of sum of squares of the position accuracy at the time of measurement by the measurement vehicle and the accuracy of the measurement by the lidar 2 and then calculates the inverse of the square of the calculated accuracy as the second weight value.

A description will be given with reference to FIG. 7 again of the relation between the accuracy of measurement by the lidar 2 and the measured distance.

According to FIG. 7, the portion of the low-rise construction 26 surrounded by the frame 30 is nearer to the measurement vehicle than the portion of the low-rise construction 26 surrounded by the frame 31 and the portion of the high-rise construction 27 surrounded by the frame 32. Thus, the second weight value for each voxel that is located at a position which overlaps with the frame 30 is set to a value (i.e., value indicative of a high degree of accuracy) larger than the second weight value for each voxel that is located at a position which overlaps with either one of the frame 31 or the frame 32. In contrast, the portion of the high-rise construction 27 surrounded by the frame 32 is located at a position a little far from the measurement vehicle and therefore the accuracy of the measurement data of the above portion acquired by the lidar 2 is predicted to be low. Thus, the second weight value for each voxel that is located at the position which overlaps with the frame 32 is set to a value (i.e., value indicative of a low degree of accuracy) smaller than the second weight value for each voxel that is located at the position which overlaps with either one of the frame 30 or the frame 31. Then, the second weight value for each voxel located at the position which overlaps with the frame 31 is set to a value that is smaller than the second weight value for each voxel corresponding to the position which overlaps with the frame 30 and that is larger than the second weight value for each voxel corresponding to the position which overlaps with the frame 32.

Next, a supplemental explanation will be given of a specific approach for updating the voxel data in cases that the voxel data corresponding to such a voxel that the first weight value, the second weight value, the mean vector and the covariance matrix are determined based on the upload information Iu is already recorded in the map DB 20.

According to a first example, the server device 200 compares the first weight value of the voxel data that is already registered in the map DB 20 to the first weight value voxel data that is newly generated and determines the voxel data which includes the larger first weight value as the voxel data to be registered in the map DB 20.

According to a second example, on the basis of the first weight value, the server device 200 calculates the weighted average between the voxel data already registered in the map DB 20 and the newly-generated voxel data. Thereby, the server device 200 determines the voxel data to be registered in the map DB 20. In this case, by calculating the weighted average between the mean vector of the voxel data already recorded in the map DB 20 and the mean vector of the newly-generated voxel data by use of their first weight values, the server device 200 calculates the mean vector to be registered in the map DB 20. Besides, by calculating the weighted average between the covariance matrix of the voxel data already recorded in the map DB 20 and the covariance matrix of the newly-generated voxel data by use of their first weight values, the server device 200 calculates the covariance matrix to be registered in the map DB 20. It is noted that the first weight value to be registered in the map DB 20 is set to the average value of their first weight values and that the second weight value to be registered in the map DB 20 is set to the average value of their second weight values.

According to a third example, in consideration of not only the first weight value but also the second weight value, the server device 200 determines the voxel data to be registered in the map DB 20 as with the first example or the second example. In this case, for example, the server device 200 calculates each index value of reliability based on an equation or table or the like whose parameters are the first weight value and the second weight value and compares each index value. Thereby, the server device 200 determines the voxel data to be registered in the map DB 20 according to substantially the same approach as the first example. In another example, the server device 200 puts weight according to the above-mentioned index values corresponding to the voxel data already recorded in the map DB 20 and the newly-generated voxel data. Thereby, the server device 200 calculates the voxel data to be registered in the map DB 20 according to substantially the same approach as the second example.

[Examples of Scan Matching Using Voxel Data]

Next, a description will be given of the NDT scan matching by use of the voxel data which includes the reliability information. Hereinafter, a description will be given of examples that the own vehicle position estimation is performed by a vehicle (simply referred to as "public vehicle") with reference to the map data delivered from the server device 200, wherein the public vehicle is equipped with lidar(s) and positioning device(s) such as a gyro sensor and a GPS receiver.

For an NDT scan matching applied to the vehicle position estimation, the following estimation parameters "P" whose elements are amount of movement on the road plane (an x-y plane) and direction of the vehicle are to be estimated.

$$P = \begin{bmatrix} t_x \\ t_y \\ \psi \end{bmatrix}$$

Herein, the sign "$t_x$" indicates the amount of movement in the x direction and the sign "$t_y$" indicates the amount of movement in the y direction and the sign "$\psi$" indicates rotational angle (i.e., yaw angle) on the x-y plane. It is noted that the amount of movement in the vertical direction, the pitch angle and the roll angle is vanishingly small though they are generated due to the road gradient and the vibration.

When a coordinate transformation by use of the above estimation parameters P is applied to the coordinates $[x_k(i), y_k(i), z_k(i)]^T$ of a point indicated by the point cloud data acquired by the lidar 2, the coordinates "$X'_k(i)$" after the coordinate transformation is expressed as the following equation (3).

$$X'_k(i) = \begin{bmatrix} x'_k(i) \\ y'_k(i) \\ z'_k(i) \end{bmatrix} = \begin{bmatrix} \cos\psi & \sin\psi & 0 \\ -\sin\psi & \cos\psi & 0 \\ 0 & 0 & 1 \end{bmatrix} \begin{bmatrix} x_k(i) \\ y_k(i) \\ z_k(i) \end{bmatrix} + \begin{bmatrix} t_x \\ t_y \\ 0 \end{bmatrix} \quad (3)$$

Then, according to the embodiment, by using the point cloud after the coordinate transformation in addition to the mean vector $\mu_k$ and the covariance matrix $V_k$ which are included in the voxel data, the public vehicle calculates the evaluation function "$E_k$" of the voxel k according to the following equation (4) and the total evaluation function "E" with respect to all voxels subjected to matching according to the following equation (5).

$$E_k = \frac{w_k}{\sum_{k=1}^{M} w_k} \cdot \frac{\frac{1}{\sigma_k^2}}{\sum_{k=1}^{M} \frac{1}{\sigma_k^2}} \cdot \frac{1}{N_k} \sum_{i=1}^{N_k} \exp\left\{-\frac{1}{2}(X'_k(i) - \mu_k)^T V_k^{-1}(X'_k(i) - \mu_k)\right\} \quad (4)$$

$$E = \sum_{k=1}^{M} E_k = E_1 + E_2 + \cdots + E_M \quad (5)$$

The sign "M" indicates the number of the voxels subjected to matching and the sign "$w_k$" indicates the first weight value corresponding to the voxel k. The sign "$\sigma_k$" indicates the accuracy information regarding the voxel k and "$1/\sigma_k^2$" indicates the second weight value corresponding to the voxel k. The second weight value $1/\sigma_k^2$ increases with increasing degree of accuracy (i.e., reliability). Thus, according to the equation (4), the evaluation function $E_k$ increases with the increasing first weight value $w_k$ and with the increasing second weight value $1/\sigma_k^2$. Additionally, since the equation (4) is normalized by the point cloud number $N_k$, the influence depending on the number of points of the point cloud in each voxel is reduced. It is noted that the coordinates of the point cloud data acquired by lidar are relative coordinates relative to the own vehicle position whereas the coordinates of the mean vector indicated by the voxel data are the absolute coordinates. Thus, at the time of calculation of the equation (4), for example, the coordinate transformation by use of the own vehicle position according to the output of a GPS receiver is applied to the coordinates of the point cloud data acquired by lidar.

In contrast, the evaluation function $E_k$ of the voxel k used in the conventional NDT matching is expressed by the following equation (6).

$$E_k = \sum_{i=1}^{N_k} \exp\left\{-\frac{1}{2}(X'_k(i) - \mu_k)^T V_k^{-1}(X'_k(i) - \mu_k)\right\} \quad (6)$$

As is obvious from the comparison between the equation (4) and the equation (6), by using the first weight value $w_k$ and the second weight value $1/\sigma_k^2$, the onboard device 1 according to the embodiment weights each voxel depending on the degree of reliability of its voxel data (mean vector and covariance matrix). Thereby, the onboard device 1 puts a small weight on the evaluation function $E_k$ for the voxel with a low degree of reliability and suitably increases the accuracy of the estimated position based on the NDT matching.

Thereafter, the public vehicle calculates such estimation parameters P that maximize the total evaluation function E by using any root-finding algorithm such as the Newton method. Then, the public vehicle estimates the own vehicle position with a high degree of accuracy by applying the estimation parameters P to the own vehicle position specified according to the output of the GPS receiver and the like.

Next, a description will be given on specific examples of the NDT scan matching. Hereinafter, for the sake of explanations, cases that the NDT scan matching is applied on the two-dimensional coordinates are explained.

Figure 8A:
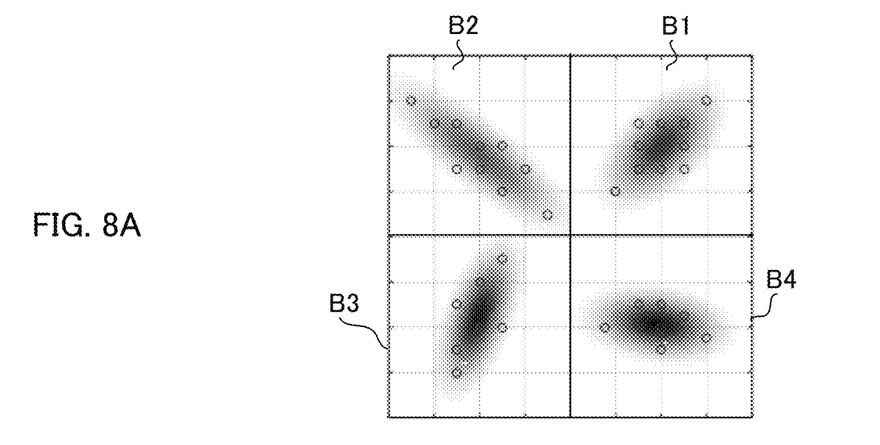
FIGS. 8A to 8C illustrate specific examples of an NDT scan matching.

FIG. 8A illustrates four voxels "B1" to "B4" adjacent to each other, wherein point cloud measured by the measurement vehicle are indicated by circles and two-dimensional normal distribution specified by parameters derived from the equation (1) and the equation (2) by use of the above point cloud is expressed by gradation. The mean and the variance of the normal distribution illustrated in FIG. 8A correspond to the mean vector and the covariance matrix of the voxel data, respectively.

Figure 8B:
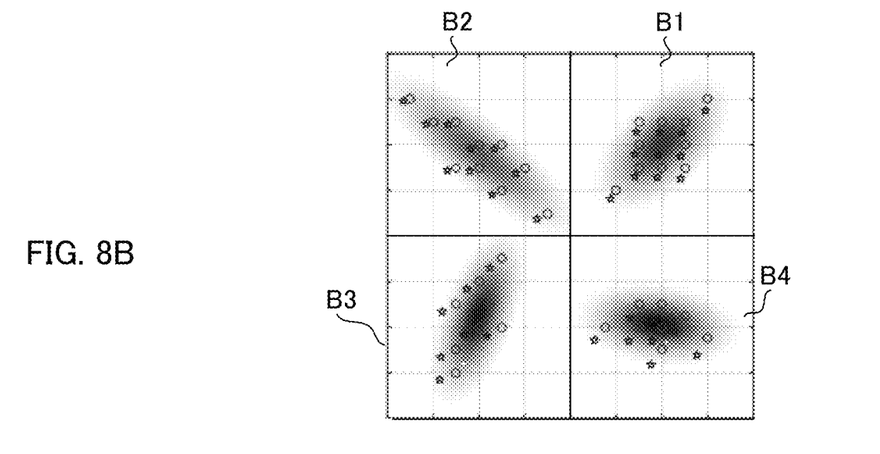

FIG. 8B illustrates, over the voxels illustrated in FIG. 8A, point cloud by stars which the public vehicle acquires during travelling for measurement. The positions of the point cloud expressed by stars (acquired by the lidar 2) are adjusted to match the positions of voxels B1 to B4 on the basis of the own vehicle position estimated by use of the output of the GPS receiver 5. According to FIG. 8B, there are differences between the point cloud (indicated by circles) measured by the measurement vehicle and the point cloud (indicated by stars) acquired by the public vehicle.

Figure 8C:
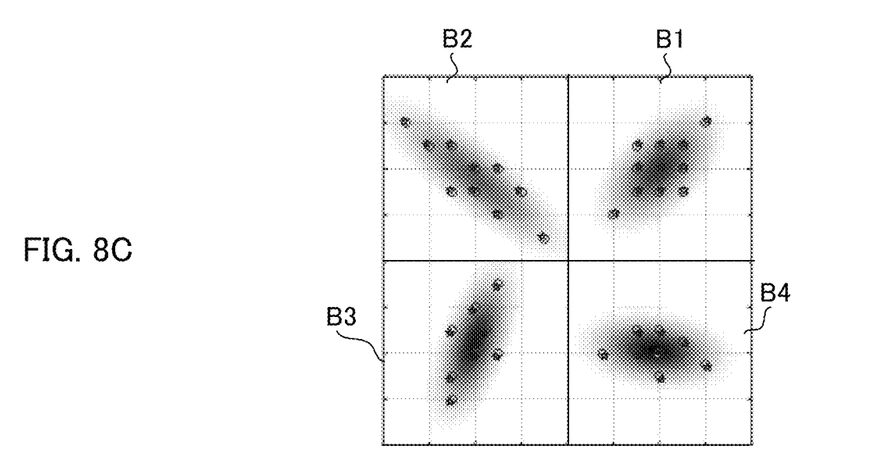

FIG. 8C illustrates the state of the voxels after the positions of the point cloud (indicated by stars) acquired by the public vehicle are shifted on the basis of the matching result of the NDT scan matching. In case of FIG. 8C, the parameters P which maximize the total evaluation function E indicated by the equation (5) is firstly calculated on the basis of the mean and the variance of the normal distribution illustrated in FIGS. 8A and 8B and then the parameters P are applied to the point cloud expressed by stars illustrated in FIG. 8B. In this case, the differences between the point cloud (indicated by circles) measured by the measurement vehicle and the point cloud (indicated by stars) acquired by the public vehicle are suitably reduced.

In cases that the evaluation functions "E1" to "E4" corresponding to the voxel B1 to B4 are calculated according to the conventionally-used general equation (6), the calculated values E1 to E4 are as follows.

E1=1.3290
E2=1.1365
E3=1.1100
E4=0.9686
E=4.5441

In this example, though there are no large differences among the evaluation functions E1 to E4 of each voxel, there are certain amount of differences due to the variation of the number of points of the point cloud in each voxel.

According to the embodiment, the first weight value and the second weight value are set to each voxel. Thus, by increasing the weight on a target voxel with increasing degree of reliability of the target voxel, it is possible to increase the degree of the matching regarding voxels with a high degree of reliability. Hereinafter, as a specific example, a description will be given, with reference to FIGS. 9A to 9C, of determination approaches of the first weight value on each of the voxels.

Figure 9A:
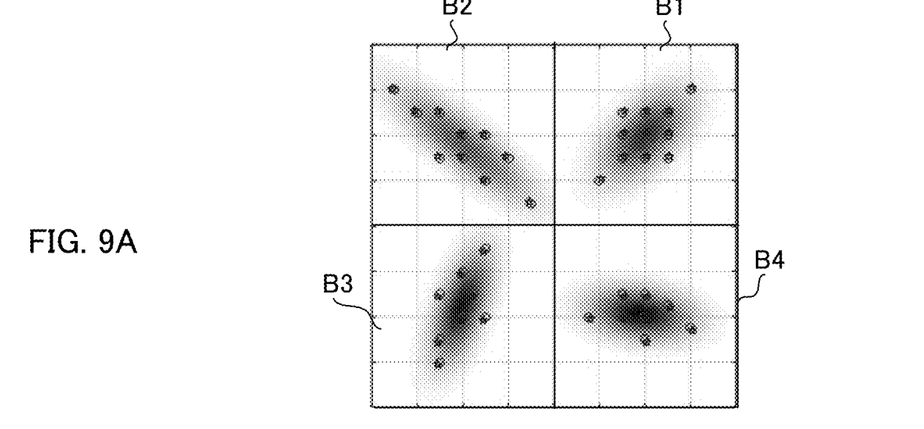
FIGS. 9A to 9C illustrate specific examples of the NDT scan matching through weighting process.
Figure 9B:
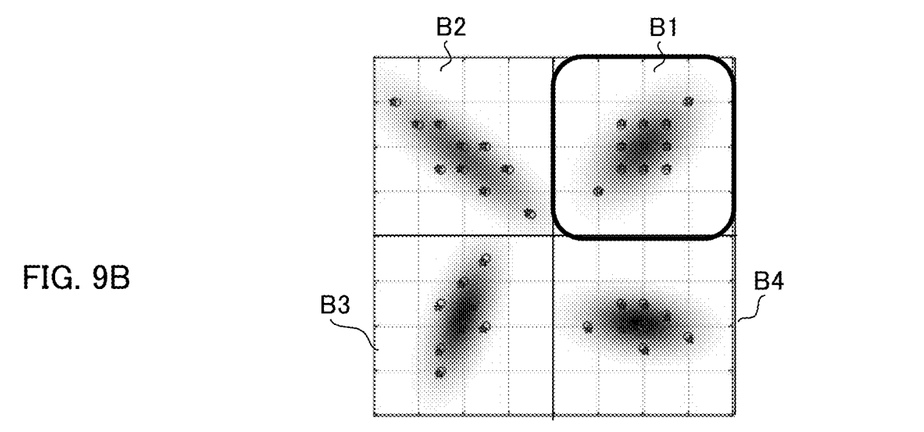
Figure 9C:
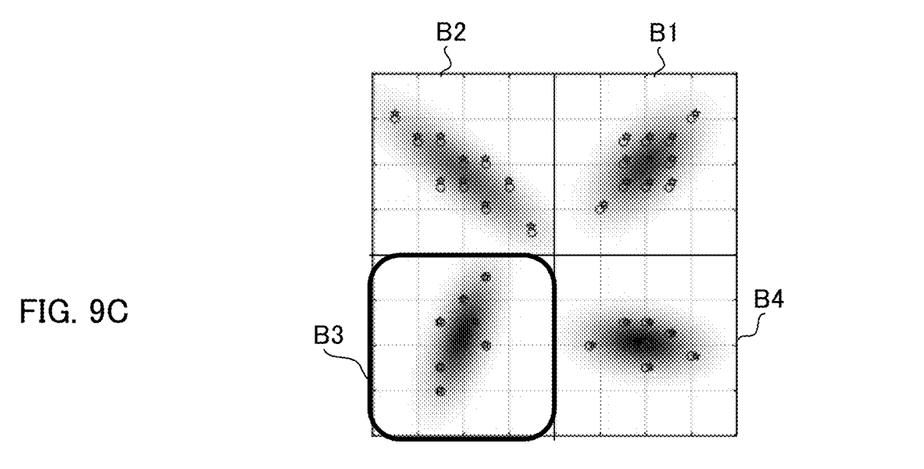

FIG. 9A illustrates the matching result in cases where the first weight values corresponding to the voxels B1 to B4 are set to be equal, i.e., FIG. 9A is identical to FIG. 8C. FIG. 9B illustrates the matching result in cases where the first weight value of the voxel B1 is ten times as large as the first weight values of the other voxels. FIG. 9C illustrates the matching result in cases where the first weight value of the voxel B3 is ten times as large as the first weight values of the other voxels. For either cases, the second weight values are set to be equal.

Regarding the example illustrated in FIG. 9B, the evaluation functions E1 to E4 corresponding to voxels B1 to B4 and the total evaluation function E are as follows.

E1=0.3720
E2=0.0350
E3=0.0379
E4=0.0373
E=0.4823

As seen from the above values, regarding the example illustrated in FIG. 9B, the matching is performed so that the value of the evaluation function E1 corresponding to the voxel B1 becomes high and therefore the degree of the matching on the voxel B1 is increased. As a result, the difference between the circles and the stars in the voxels B1 becomes small. Though the above values of the evaluation functions become small because of the normalization by use of the number of points of the point cloud, each value of the evaluation functions is almost proportional to its first weight value.

Regarding the example illustrated in FIG. 9C, the evaluation functions E1 to E4 corresponding to voxels B1 to B4 and the total evaluation function E are as follows.

E1=0.0368
E2=0.0341
E3=0.3822
E4=0.0365
E=0.4896

As seen from the above values, regarding the example illustrated in FIG. 9C, the matching is performed so that the value of the evaluation function E3 corresponding to the voxel B3 becomes high and therefore the degree of the matching on the voxel B3 is increased. As a result, the difference between the circles and the stars in the voxels B3 becomes small. In this way, by suitably determining the first weight value, it is possible to suitably increase the degree of the matching on such a voxel with little probability of occurrence of occlusion. In other words, it is possible to suitably reduce the degree of the matching on such a voxel with a high probability of occurrence of occlusion. It is also true for the second weight value. By suitably determining the second weight value, it is possible to suitably increase the degree of the matching on such a voxel with a relatively high degree of measurement accuracy while decreasing the degree of the matching on such as voxel with a relatively low degree of measurement accuracy.

As described above, the server device 200 according to the embodiment functions as a map generation device which assigns (adds), to voxel data in the map DB 20 which is divided into multiple voxels, a first weight value for each voxel, wherein the first weight value is associated with the presence of a stationary object and a moving object. Then, the server device 200 acquires upload information Iu which includes position information relating to a travelling route of a measurement vehicle during measurement of point cloud data needed for generation or update of the voxel data. Then, the server device 200 determines the first weight value for each voxel based on the travelling route of the measurement vehicle identified by the position information included in the upload information Iu. Thereby, on the basis of the upload information Iu generated by the onboard vehicle 1 of the measurement vehicle, the server device 200 can suitably assign, to the generated voxel data, the first weight value associated with the presence of a stationary object and a moving object.

[Modifications]

Modifications suitable for the above embodiment will be described below. The following modifications may be applied to the embodiments in combination.

(First Modification)

In the voxel data included in the map DB 10, as indicated by FIG. 3, the first weight value and the second weight value are recorded as the reliability information. Instead, either one of the first weight value or the second weight value may be recorded as the reliability information in the voxel data. In this case, on the basis of the upload information Iu, the server device 200 determines either one of the first weight value or the second weight value for each voxel.

(Second Modification)

The data structure of the voxel data is not limited to such a data structure including the mean vector and the covariance matrix as illustrated in FIG. 3. For example, the voxel data may include point cloud data, which is measured by the measurement vehicle and which is used for calculation of the mean vector and the covariance matrix, as it is. Furthermore, the voxel data which the server device 200 generates or updates is not limited to such voxel data subjected to the NDT scan matching. Instead, the voxel data may be subjected to any other scan matching method such as ICP (Iterative Closest Point).

BRIEF DESCRIPTION OF REFERENCE NUMBERS

1 Onboard device
20 Map DB
11 Interface
12 Storage unit
14 Input unit
15 Control unit
16 Information output unit
200 Server device

The invention claimed is:

1. A map generation device comprising:
a memory configured to store a program;
a central processing unit (CPU) coupled to the memory and configured to execute the program to:
assigns, to map data which is divided into multiple regions, a weight value associated with a presence of a stationary object and a moving object;
acquire a travelling route of a vehicle, which measured data that is needed for generation or update of the map data;
determine, on a basis of a position of a lane on the travelling route, the weight value for each of the multiple regions;
in a case where the lane on the travelling route is a left-hand lane on a road where the vehicle travelled, decrease the weight value corresponding to all regions located to a right side of the lane; and
in a case where the lane on the travelling route is a right-hand lane on the road, decrease the weight value corresponding to all regions located to a left side of the lane.

2. The map generation device according to claim 1, wherein the CPU is configured to execute the program to, in a section where the vehicle avoided an obstacle on the travelling route, decrease the weight value corresponding to a region located on an opposite side to an avoidance direction.

3. The map generation device according to claim 1, wherein the CPU is configured to execute the program to determine the weight value corresponding to each of the multiple regions based on a height of each of the multiple regions.

4. The map generation device according to claim 1, wherein the CPU is configured to execute the program to, for a region of measurement, assign, to the map data, accuracy information indicative of an accuracy of measurement data in the region.

5. The map generation device according to claim 4, wherein the CPU is configured to execute the program to determine the accuracy information based on an accuracy of a defined position at a time of the measurement and a distance between the defined position and the region of the measurement.

6. The map generation device according to claim 1, wherein the weight value is used for self-position estimation.

7. A control method executed by a map generation device, the control method comprising:
by the map generation device, assigning to map data, which is divided into multiple regions, a weight value associated with presence of a stationary object and a moving object;
acquiring a travelling route of a vehicle which measured data that is needed for generation or update of the map data;
determining, on a basis of a position of a lane on the travelling route, the weight value for each of the multiple regions;
in a case where the lane on the travelling route is a left-hand lane on a road where the vehicle travelled, decreasing the weight value corresponding to all regions located to a right side of the lane; and
in a case where the lane on the travelling route is a right-hand lane on the road, decreasing the weight value corresponding to all regions located to a left side of the lane.

8. A non-transitory computer readable medium including instructions executed by a computer of a map generation device, the instructions comprising:
by the map generation device, assigning to map data, which is divided into multiple regions, a weight value associated with presence of a stationary object and a moving object;
acquiring a travelling route of a vehicle which measured data that is needed for generation or update of the map data;
determining, on a basis of a position of a lane on the travelling route, the weight value for each of the multiple regions;
in a case where the lane on the travelling route is a left-hand lane on a road where the vehicle travelled, decreasing the weight value corresponding to all regions located to a right side of the lane; and
in a case where the lane on the travelling route is a right-hand lane on the road, decreasing the weight value corresponding to all regions located to a left side of the lane.

9. A map generation device which assigns, to map data which is divided into multiple regions, a weight value associated with a presence of a stationary object and a moving object, the map generation device comprising:
a memory configured to store a program;
a central processing unit (CPU) coupled to the memory and configured to execute the program to:
acquire a travelling route of a vehicle which measured data that is needed for generation or update of the map data;
determine, on a basis of the travelling route, the weight value for each of the multiple regions; and
in a section where the vehicle avoided an obstacle on the travelling route, decrease the weight value corresponding to a region located on an opposite side to an avoidance direction.

* * * * *